US012662321B2

(12) United States Patent
Grothen

(10) Patent No.: US 12,662,321 B2
(45) Date of Patent: Jun. 23, 2026

(54) LATERALLY ARTICULABLE BELT CONVEYOR SYSTEMS

(71) Applicant: ROBBINS MINING, INC., Solon, OH (US)

(72) Inventor: Bradley Dean Grothen, Renton, WA (US)

(73) Assignee: Robbins Mining, Inc., Solon, OH (US)

( * ) Notice: Subject to any disclaimer, the term of this patent is extended or adjusted under 35 U.S.C. 154(b) by 85 days.

(21) Appl. No.: 18/667,922

(22) Filed: May 17, 2024

(65) Prior Publication Data

US 2024/0383687 A1      Nov. 21, 2024

Related U.S. Application Data

(60) Provisional application No. 63/503,450, filed on May 19, 2023.

(51) Int. Cl.
B65G 17/02          (2006.01)
B65G 17/06          (2006.01)
(Continued)

(52) U.S. Cl.
CPC ........... B65G 17/02 (2013.01); B65G 17/086 (2013.01); B65G 21/14 (2013.01); B65G 21/22 (2013.01); B65G 23/44 (2013.01); B65G 17/06 (2013.01)

(58) Field of Classification Search
CPC ........ B65G 21/14; B65G 17/06; B65G 17/02; B65G 17/086; B65G 21/22; B65G 23/44
(Continued)

(56) References Cited

U.S. PATENT DOCUMENTS 3,701,411 A * 10/1972 McGinnis .............. B65G 21/14
                                            198/840
3,970,190 A * 7/1976 Kovats ................... B65G 17/10
                                            198/822
(Continued)

FOREIGN PATENT DOCUMENTS

DE          819817 C      11/1951
DE          10149101 A1 * 3/2003    ............. B65G 17/02
(Continued)

OTHER PUBLICATIONS

Extended European Search Report mailed Dec. 17, 2024, issued in corresponding European Application No. EP 24176869, filed May 20, 2024, 10 pages.

*Primary Examiner* — James R Bidwell
(74) *Attorney, Agent, or Firm* — Christensen O'Connor Johnson Kindness PLLC

(57)                    ABSTRACT

A laterally articulable belt conveyor assembly is provided. The assembly has a central chain forming a loop extending around a first roller wheel and a second roller wheel, a plurality of elongate slats operably coupled to the central chain and each having rolling members at their lateral ends, a belt operably coupled to each of the plurality of elongate slats, the belt configured to carry excavated muck from a loading end portion to an unloading end portion. The assembly further includes a plurality of guide rail pairs each forming a gap for receiving the rolling members therebetween and directing the plurality of elongate slats along the gap. The guide rail pairs can be articulable from a straight configuration to a curved configuration, where the belt travels in a laterally curved path. The guide rail pairs can be telescoping in length to adjust to the curved configuration.

27 Claims, 7 Drawing Sheets

(51) Int. Cl.
    *B65G 17/08*       (2006.01)
    *B65G 21/14*       (2006.01)
    *B65G 21/22*       (2006.01)
    *B65G 23/44*       (2006.01)

(58) Field of Classification Search
    USPC ...................................................... 198/861.2
    See application file for complete search history.

(56)                  References Cited

U.S. PATENT DOCUMENTS

| | | | |
|---|---|---|---|
| 4,024,949 A | | 5/1977 | Kleysteuber et al. |
| 4,773,528 A | * | 9/1988 | Anderson ............... E21F 13/08 |
| | | | 198/612 |
| 9,296,566 B2 | * | 3/2016 | Finatzer ................. B65G 39/20 |
| 2020/0283233 A1 | * | 9/2020 | Santana ................. B65G 17/42 |

FOREIGN PATENT DOCUMENTS

| | | | |
|---|---|---|---|
| GB | 774971 A | 5/1957 | |
| WO | 2012/159132 A2 | 11/2012 | |
| WO | 2019/056083 A1 | 3/2019 | |

* cited by examiner

LATERALLY ARTICULABLE BELT CONVEYOR SYSTEMS

CROSS-REFERENCE TO RELATED APPLICATION

This application claims the benefit of Provisional Application No. 63/503,450, filed May 19, 2023, the disclosure of which is hereby incorporated by reference herein in its entirety for all purposes.

BACKGROUND

Conveyor systems can be used in tunnel boring, mining, construction, waste management and other operations to transport excavated materials away from an excavation source (e.g., a digging site, a tunnel boring machine face, a drilling head, etc.) These excavated materials are typically generated by tunnel boring or material mining operations. These conveyor belts are designed to transport the loose excavated materials, commonly referred to as muck, which can include soil, rock, debris, and other excavated materials. Efficient muck handling systems are critical for the productivity and safety of these operations.

In applications related to tunnel boring, conveyors can be used in conjunction with the tunnel boring machines to move excavated materials away from the tunnel boring cutterhead as the machine creates the tunnel, allowing continuous operation of boring and drilling equipment. The excavated materials can be transported by the conveyor where they are transferred to a vessel for removal from the tunnel boring site, e.g., by dump truck, trailer, railcar, etc. These muck belts must be robust and durable to handle the abrasive and heavy nature of the transported material. Conveyors used in conjunction with a tunnel boring machine are typically belt-type conveyors designed to transport muck materials without significant spillage of finer-grain materials and/or partially liquid materials (e.g., mud).

Conventional belt-type conveyors suffer from several limitations, including high wear and tear, frequent maintenance requirements, and inability to conform to relatively tight lateral articulation, e.g., bending to follow a curved tunnel path. The stresses in the conveyor belt limit the practical curvature that these conventional systems can withstand. When a belt is subjected to a significant lateral curve, or a combination of lateral and vertical curves, the inside edge portion of the belt buckles (e.g., wrinkles, lifts, etc.) and the belt displaces laterally inward toward the center of curvature, attempting to straighten based on internal forces in the belt.

In other industries, conveyor articulation is accomplished by an articulating conveying surface, such as a slat-type conveyor where individual slats of the conveying surface are movable with respect to the other slats to avoid the buckling and straightening forces in a conventional belt. These slat-type conveyor systems can articulate around relatively tight corners, but are not configured to retain muck and material from tunnel boring and mining operations, and the environment of carrying muck is not conducive to slat articulation. Therefore, a need exists for a laterally articulable conveyor system that is capable of reliably transporting muck material along a curved path.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Figure 1:
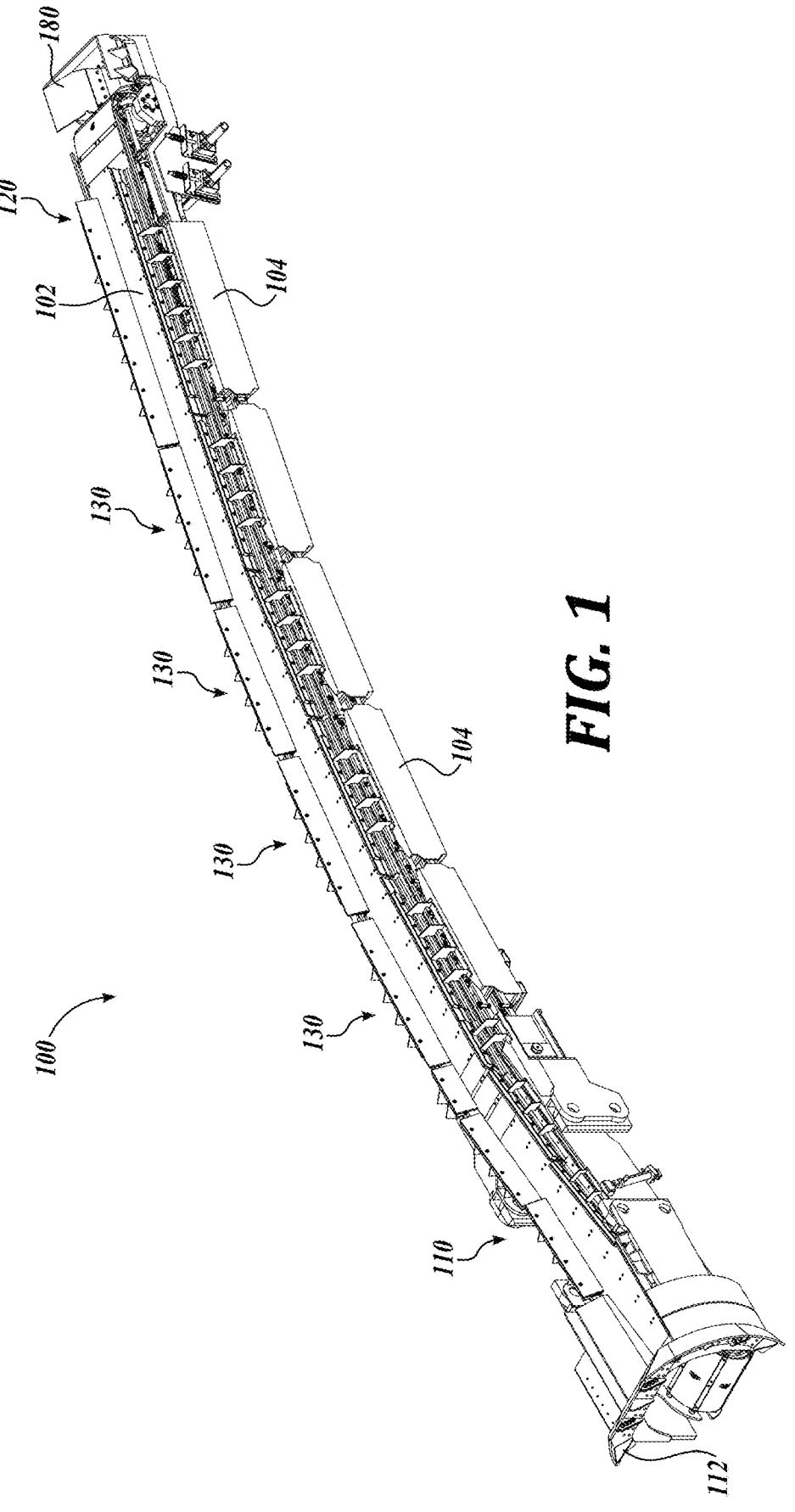
FIG. 1 is a laterally articulable belt conveyor system, in accordance with embodiments of the present disclosure.

The detailed description set forth herein connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

As will be described in more detail below, the present disclosure provides examples of laterally articulable belt conveyor systems configured to laterally bend along a curve in the plane of the belt to conform to a conveyor path having curves with a smaller radius than those navigable by conventional flat belt conveyor systems. In some embodiments, the system is capable of articulating around a curve having a 20 m radius, a 30 m radius, a 40 m radius, a 50 m radius, or greater than a 50 m radius. Although the lateral articulation of the flat belt conveyor systems is described in detail herein, embodiments of the present disclosure can be used in locations with lateral curves, vertical curves, or a combination thereof. In locations with vertical curves and/or combinations of vertical and lateral curves, the conveyor is further articulable to vertically bend, either in conjunction with the lateral bend or separately from the lateral bend.

Although embodiments of the present disclosure may be described with reference to configurations of a laterally articulable belt (e.g., a flat belt) conveyor system, including the configurations shown in the FIGURES, one skilled in the relevant art will appreciate that the disclosed embodiments are illustrative in nature and therefore should not be construed as limited to such an application. It should therefore be apparent that the disclosed technologies and methodologies have wide application, and therefore may be suitable for use with many types of mining or boring conveying configurations. Accordingly, the following descriptions and illustrations herein should not limit the scope of the claimed subject matter.

The laterally articulable belt conveyor systems of the present disclosure have a central chain extending along the frame of the system to which tension is applied. By tensioning the central chain rather than the belt, the belt itself does not experience significant tension and is permitted to articulate, particularly in the lateral bending direction. The configuration of the embodiments described herein is in contrast to conventional belt conveyor systems where the belt itself is tensioned by the rollers of the conveyor to keep the belt from buckling or binding. In those conventional systems, significant tension must be applied to the belt for the conveyor to function. However, the embodiments of the present disclosure are configured to tension the central chain as the system articulates through lateral and/or vertical curved configurations, which imparts no significant tension into the belt. These embodiments allow a relatively lower strength belt to be used with the system, lowering weight, friction, cost, etc. of the system.

FIG. 1 is a laterally articulable belt conveyor system 100 ("system 100") in accordance with aspects of the present disclosure. As will be described in detail below, the system 100 includes a belt 102 supported by a plurality of elongate slats connected by a central chain that forms a loop and travels along a frame side component 104 of the system 100. Although the belt 102 is described herein as a flat belt, the belt 102 can have ridges, grooves, paddles, or other features to assist the transportation of muck along the system 100. The system 100 generally has a loading end 110 (see FIG. 2) and an unloading end 120 (see FIG. 3), with a plurality of intermediate units 130 (see FIGS. 4A-4C) positioned therebetween to support the belt 102 as it conveys muck from the loading end 110 to the unloading end 120. The loading end 110 can include a shield 112 to direct and distribute muck on the belt 102, and the unloading end 120 can include a collector chute portion 180 to direct the muck into a container for transport away from the site. Although the system 100 is shown with four intermediate units 130, any number of intermediate units 130 can be used to lengthen or shorten the system 100 based on the desired application. Further, the length of the intermediate units 130 can be increased or decreased to adapt the system 100 to the degree of articulation required by the application. For example, as will be described below, when the system 100 is used in applications where smaller radius lateral bends are required, the intermediate units 130 can be shortened to facilitate increased articulation. In the illustrated embodiment, the system 100 is shown with a lateral bend in a single direction; however, the system 100 can have multiple bends of different directions, compound bends, and/or lateral bends in conjunction with vertical bends.

Figure 2:
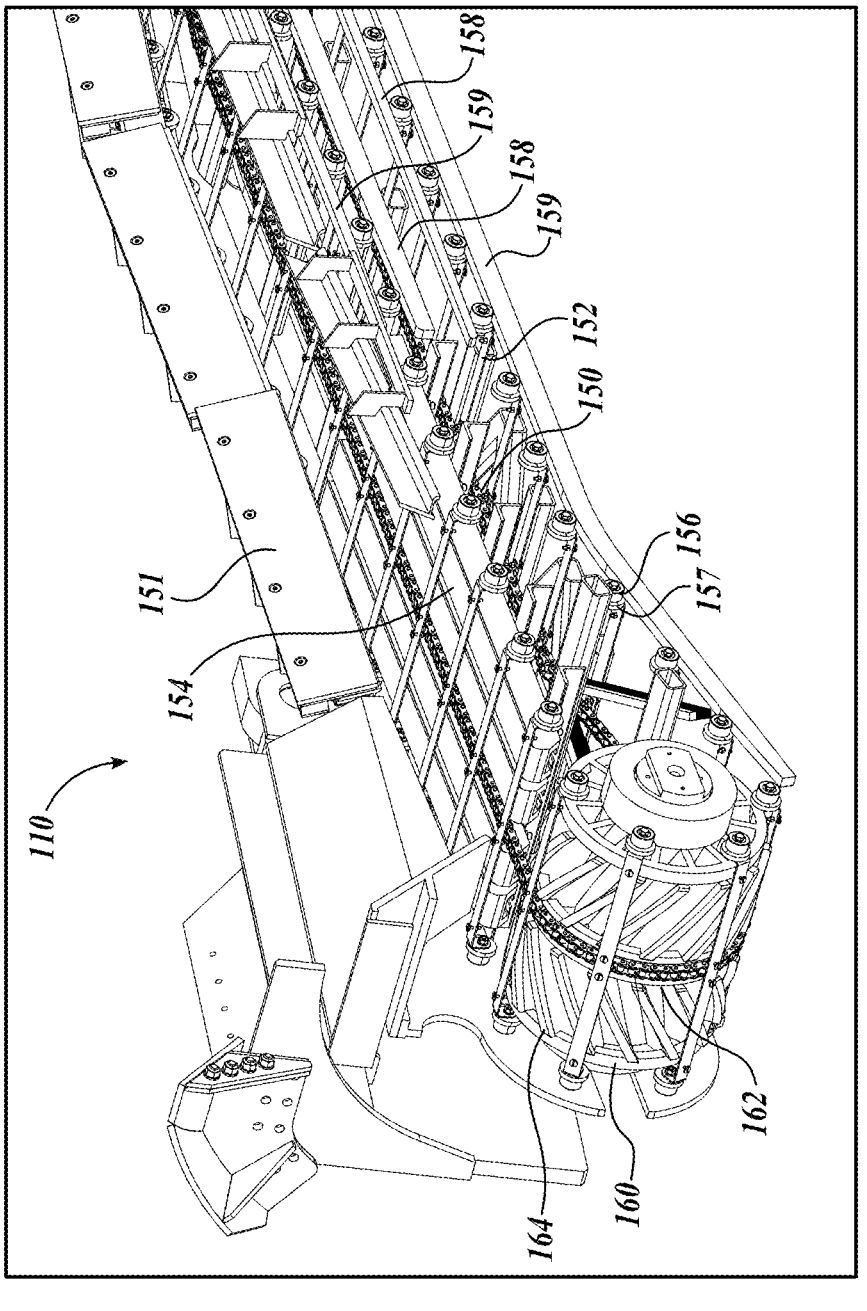
FIG. 2 is a detail view of a loading end of the laterally articulable belt conveyor system of FIG. 1, with the conveyor belt and certain components of the system hidden for visibility purposes.
Figure 3:
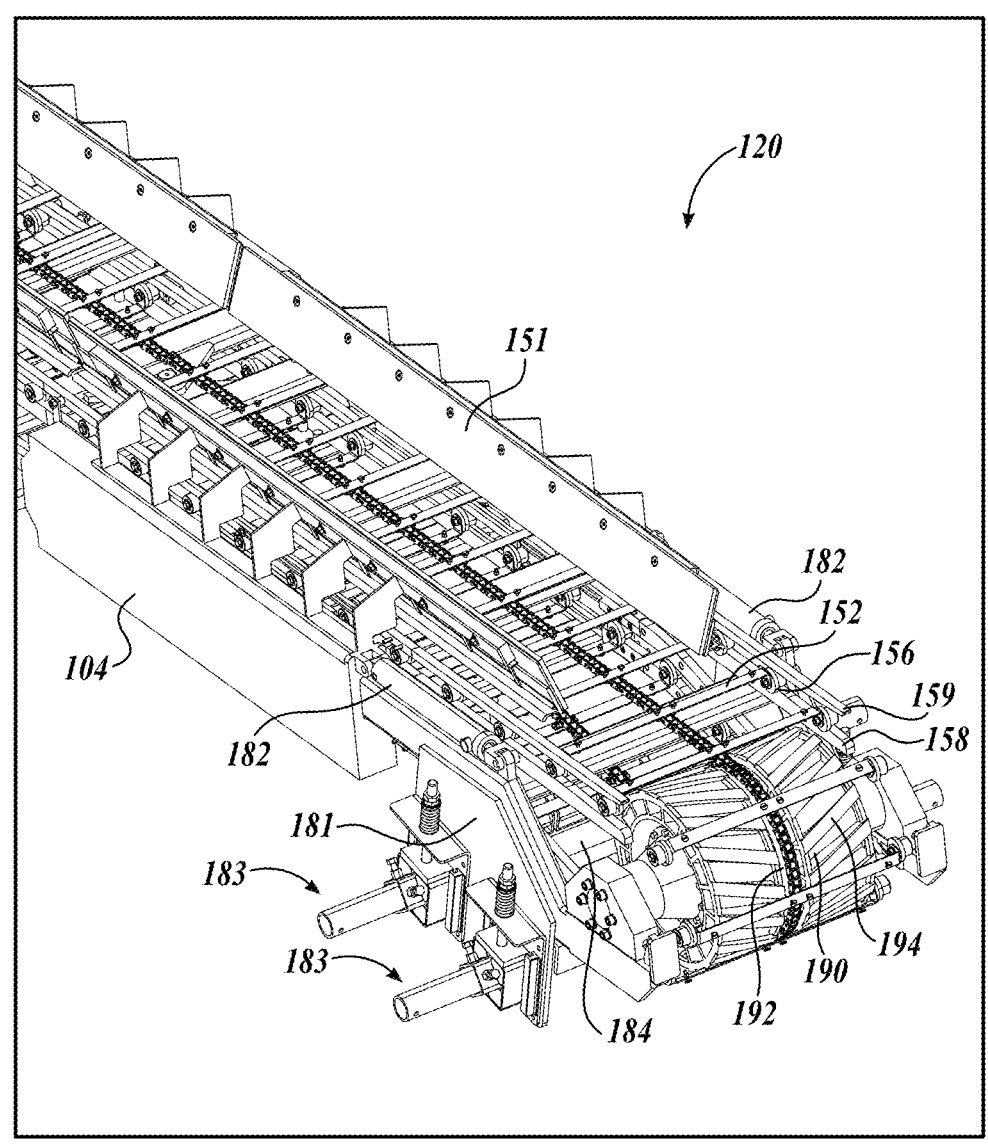
FIG. 3 is a detail view of an unloading end of the laterally articulable belt conveyor system of FIG. 1, with the conveyor belt hidden for visibility purposes.

FIG. 2 shows the loading end 110 of the system 100 and FIG. 3 shows the unloading end 120 of the system, each in accordance with embodiments of the present disclosure. In FIGS. 2 and 3, the belt 102 and certain other components of the system 100 are hidden for visibility purposes. As shown in FIGS. 2 and 3, a central chain 150 forms a loop that extends along the length of the system 100 at a laterally central position, traveling from the loading end 110 to the unloading end 120 along an upper portion of the system 100 and returning from the unloading end 120 to the loading end 110 along a lower portion of the system. As described above, the central chain 150 carries the tension of the system 100 required to support the belt carrying the muck for transport, while the laterally central position of the central chain 150 provides a neutral bending point for lateral articulation in either direction.

A plurality of slats 152 can be operably coupled to the central chain 150 spaced apart at a distance suitable to provide vertical support to the flat belt 102 during use. The slats 152 can extending laterally outward from the central chain 150 perpendicular to the direction of travel of the flat belt 102. The slats 152 can be operably coupled to the belt 102 by fasteners 106 (see FIGS. 4A and 4B) and support the belt during operation of the system 100. The plurality of slats

152 can be operably coupled to the central chain 150 such that the slats 152 travel through the lateral articulation of the system 100 while staying parallel with the chain 150 at the attachment point. In some embodiments, the plurality of slats 152 are operably coupled to the chain 150 by a chain link bracket. Although the plurality of slats 152 are shown as being generally formed from sheet metal, in other embodiments, the plurality of slats 152 can be formed from any suitable manufacturing process, including casting, injection molding, 3D printing, etc. In some embodiments, the plurality of slats 152 have one or more bent flanges for increased strength. The belt 102 carries the muck along the system 100 and the loading and unloading ends 110 and 120 further include side boards 151 configured to retain the muck within the conveyor. As will be described below, the bottom of the side boards 151 can have a lip seal (see lip seal 175 in FIGS. 4A and 4B) to reduce water run off from the side of the belt 102.

The lateral ends of each of the slats 152 can be rotatably coupled to a rolling member 156 (e.g., a roller wheel) configured to direct the respective slat 152 along the system 100. During use of the system 100, the rolling members 156 travel along guide rails of the system and are retained between a lower guide rail 158 and upper guide rail 159 in a pair. The system 100 can have a first guide rail pair (of a lower guide rail 158 and an upper guide rail 159) configured to direct the rolling member 156 from the loading end 110 to the unloading end 120 (e.g., at an upper side of the system 100), and a second guide rail pair (of a lower guide rail 158 and an upper guide rail 159) configured to direct the rolling member 156 back from the unloading end 120 to the loading end 110 (e.g., at a lower side of the system 100). In some embodiments, the lower and upper guide rails 158 and 159 provide lateral and vertical retention of the slats, e.g., to guide the slats around a lateral and/or vertical curve, and to prevent lifting of the slats (and thereby the belt) around the curves, particularly in relatively tight lateral curves and/or vertical curve valleys. In this regard, the rolling members 156 can have a circumferential flange 157 extending radially outward that interacts laterally with the lower and upper guide rails 158 and 159 to retain the slats 152 laterally, e.g., during lateral articulation of the system 100.

The system 100 can include a roller wheel 160 positioned at the loading end 110 and configured to guide the central chain 150, slats 152, and belt 102 around the loading end 110 from a return path under the system 100 and to the top of the conveyor for loading of muck from tunnel boring operations. The roller wheel 160 can include a central trough 162 configured to carry the chain 150 and a plurality of paddles 164 arranged in, e.g., a chevron pattern, that are configured to clear muck that is attached to the underside of the belt 102 and slats 152 and distribute the muck laterally. The system 100 can further include a roller wheel 160 positioned at the loading end 110 and configured to guide the central chain 150, slats 152, and belt 102 around the loading end 110 from a return path under the system 100 and to the top of the conveyor for loading of muck from tunnel boring operations. The roller wheel 160 can include a central trough 162 configured to carry the chain 150 and a plurality of paddles 164 arranged in, e.g., a chevron pattern, that are configured to clear muck that is attached to the underside of the belt 102 and slats 152 and distribute the muck laterally.

The system 100 can further include one or more load-bearing pads 154 under the loading area to prevent the belt 102, slats 152, guide rails 158 and 159, and/or central chain 150 from absorbing the force of the weight and impact of the muck initially loaded onto the belt of the system 100. The loading end 110 is shown with various components (e.g., brackets, chutes, walls, fixtures, support members, etc.) to enable loading of muck onto the belt of the system 100. These components are intended as only one exemplary configuration of the loading end 110 of the system 100 and should not be considered as limiting to the scope of the embodiments described herein.

As shown in FIG. 3, the unloading end 120 can have a roller wheel 190 similar to the roller wheel 160 at the loading end 110. In this regard, the roller wheel 190 at the unloading end can include a central trough 192 for receiving the chain 150, and a plurality of paddles 194. Either or both of the rollers 160 and 190 at the ends 110 and 120, respectively, can be driven within the system 100; however, in the illustrated embodiment, the roller 190 at the unloading end 120 is driven while the roller 160 is an idler. In this configuration, the driven roller (e.g., the roller at the unloading end 120 in an embodiment) can be toothed within the central trough 192, such as by having a sprocket (not shown) mounted to the center of the roller within the trough to engage and drive the chain 150.

The unloading end 120 can include a take up frame 181 to tension the chain 150. The take up frame 181 can include tensioning cylinders 182 that are configured to actuate and push the take up frame 181 to move the roller 190 to tension the chain 150. The take up frame 181 can further include components to remove debris from the conveying surface of the belt, e.g., scrapers, brushes, and the like. In this regard, the system 100 can further include a series of cleaning members 183 having scraper portions 184 configured to clean muck from the belt 102. In the illustrated embodiment, the components to remove debris are secondary scrapers 184 and the cleaning member 183 have devices to position the secondary scrapers 184 at the desired location and with the desired tension with respect to the belt 102. The scrapers 184 can be configured to work in conjunction with the plurality of paddles 164 and 194 in the chevron pattern of the rollers at each end, with the scrapers 184 cleaning the conveying surface of the belt 102, and the paddles 164 and 194 cleaning the underside of the belt 102 and the slats 152.

Figure 4A:
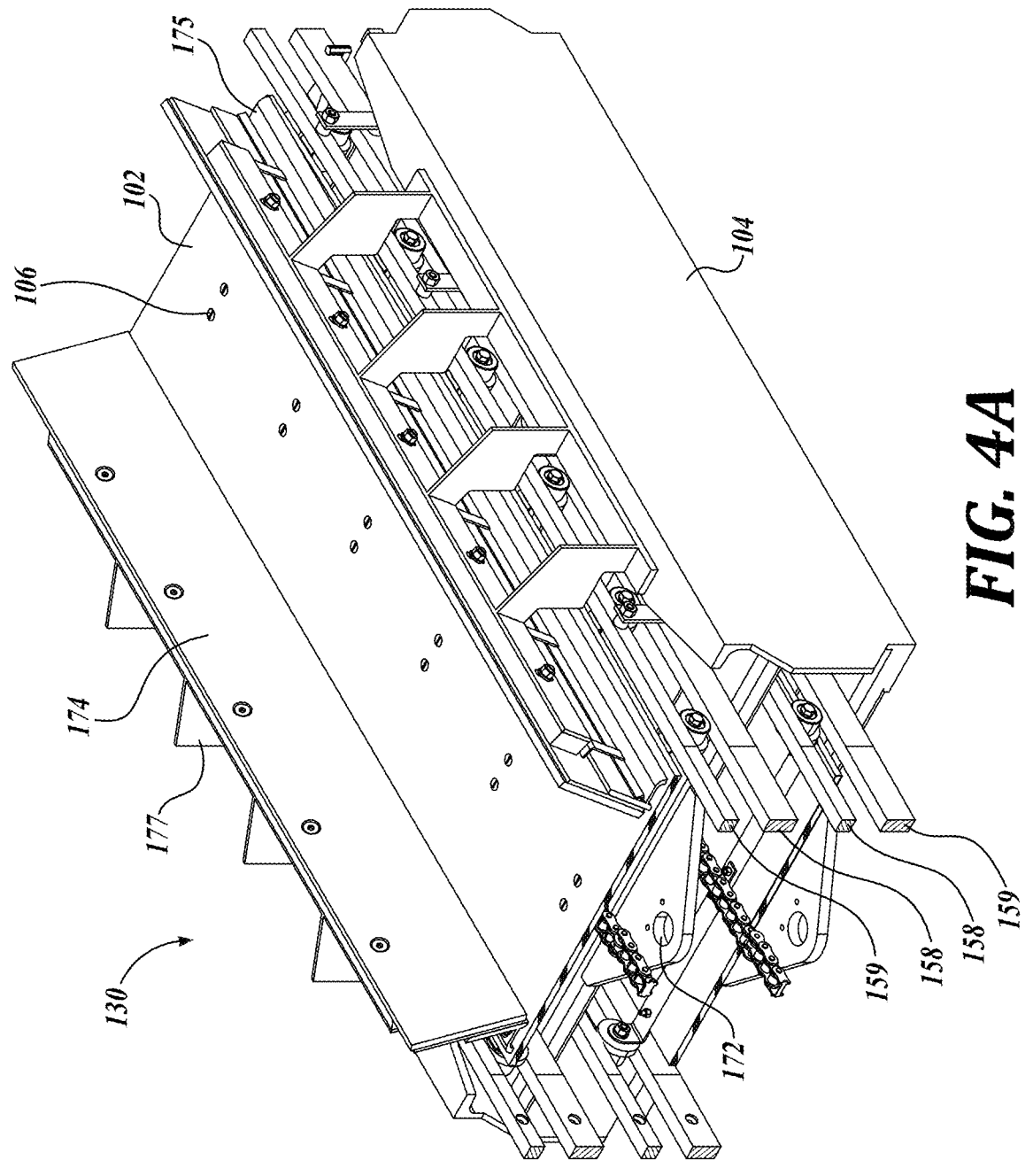
FIGS. 4A and 4B are perspective views and FIG. 4C is a cross-sectional view of an intermediate unit of the laterally articulable belt conveyor system of FIG. 1.
Figure 4B:
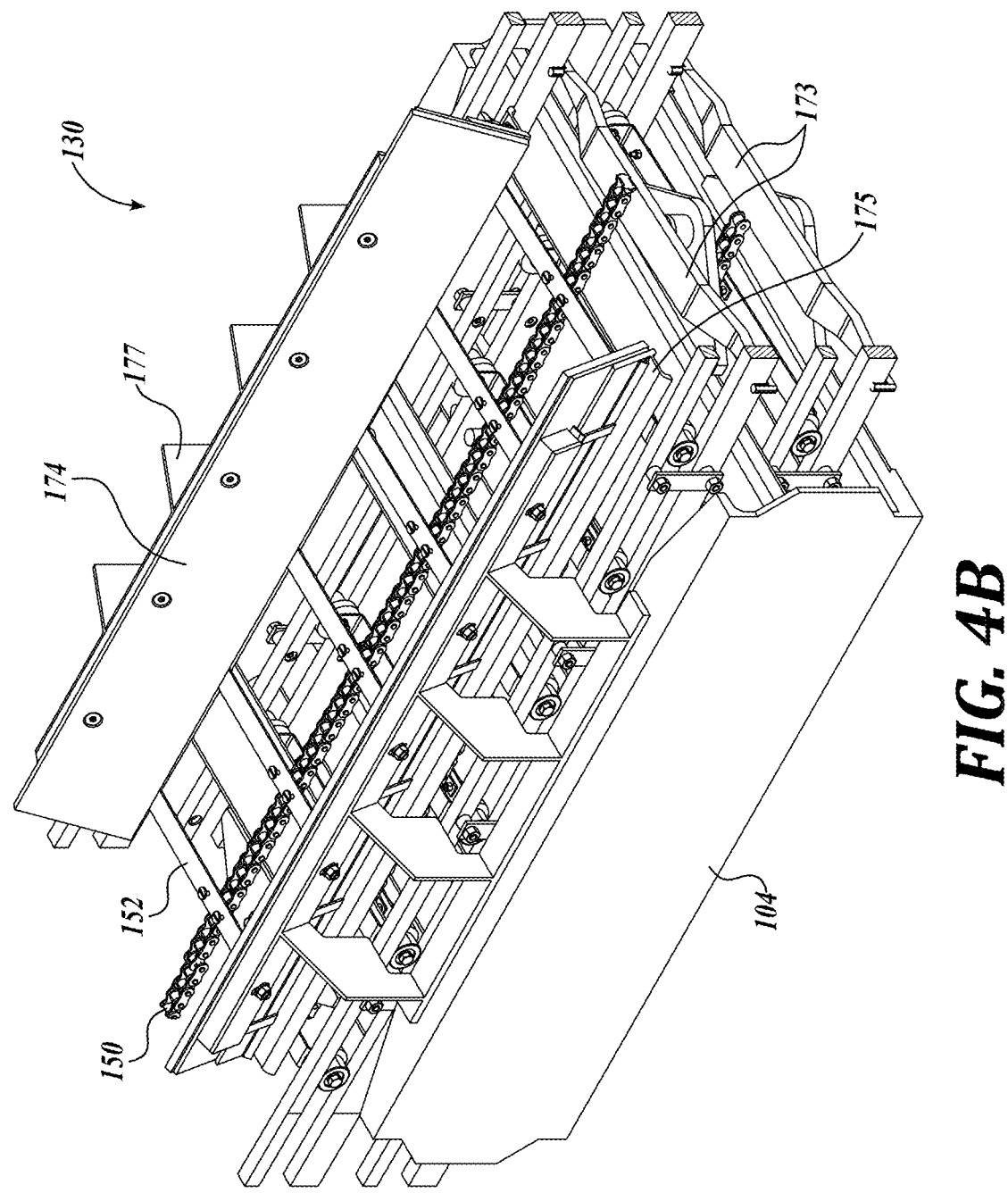
Figure 4C:
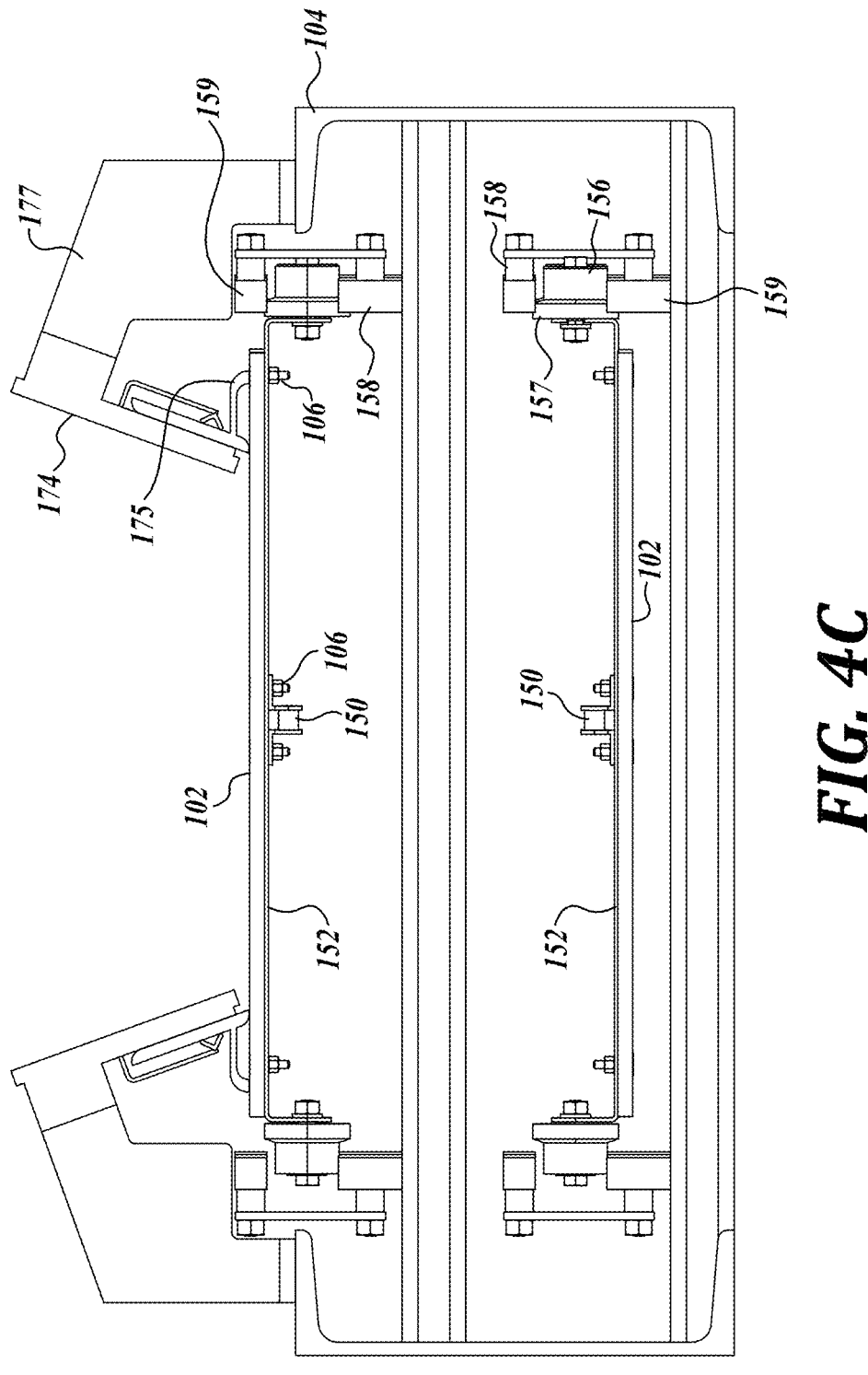

FIGS. 4A-4C show the intermediate units 130 of the system 100, with FIG. 4A showing the intermediate unit 130 with the conveyor belt, FIG. 4B showing the intermediate unit 130 with the conveyor belt hidden for clarity purposes, and FIG. 4C showing a cross-section of the intermediate unit 130. The units 130 are shown with only sections of the frame side component 104, belt 102, slats 152, wheels 156, side boards 174, etc. to show the interaction between the belt/slats and the unit 130. Each unit can be any length and support any number of slats and can be shorter or longer than shown in the FIGURES. The unit 130 can be shortened to allow, e.g., tighter curvature with more articulation points, easier transport and/or maneuverability, etc., or can be lengthened to increase stability, decrease the number of units in a length of conveyor run, etc. Each intermediate unit 130 can include articulation points 172 that can be pinned to either of the loading and unloading ends 110 and 120, or another intermediate unit 130 to allow the system 100 to articulate in the lateral direction. The intermediate units 130 can further include upper and lower guide rail tie bars 173 configured to maintain spacing of the guide rails 158 and 159 between intermediate units 130 mounted at the articulation points 172, e.g., maintaining the spacing of the guide rails during articulation of the system 100.

The intermediate units 130 can include retaining side boards 174 (functioning in conjunction with side boards 151, see FIGS. 2 and 3) extending along each side of the belt

102 on top of the belt 102. The side boards 174 are configured to laterally retain the muck on the belt 102 during use of the system 100, and are further configured to vertically retain the belt 102 atop the slats 152. In this regard, during laterally curved usage of the system 100, the belt portion on the lateral inside of the curve can tend to buckle and/or raise off the slats 152. The side boards 174 are configured to apply a downward pressure to maintain the general flatness of the belt 102 during this laterally articulated operation. The side boards 174 can include one or more flashing members 175 ("lip seals 175") to both reduce lateral water runoff, and to apply pressure to the belt and to prevent warping, binding, and lifting of the belt in a curved configuration. In the embodiments shown in the FIGURES, the side boards 174 and the lip seals 175 are fixed to the frame side component 104 with flange brackets 177; however, the side boards 174 can be adjustable in any degree of freedom to accommodate the system 100.

Figure 5:
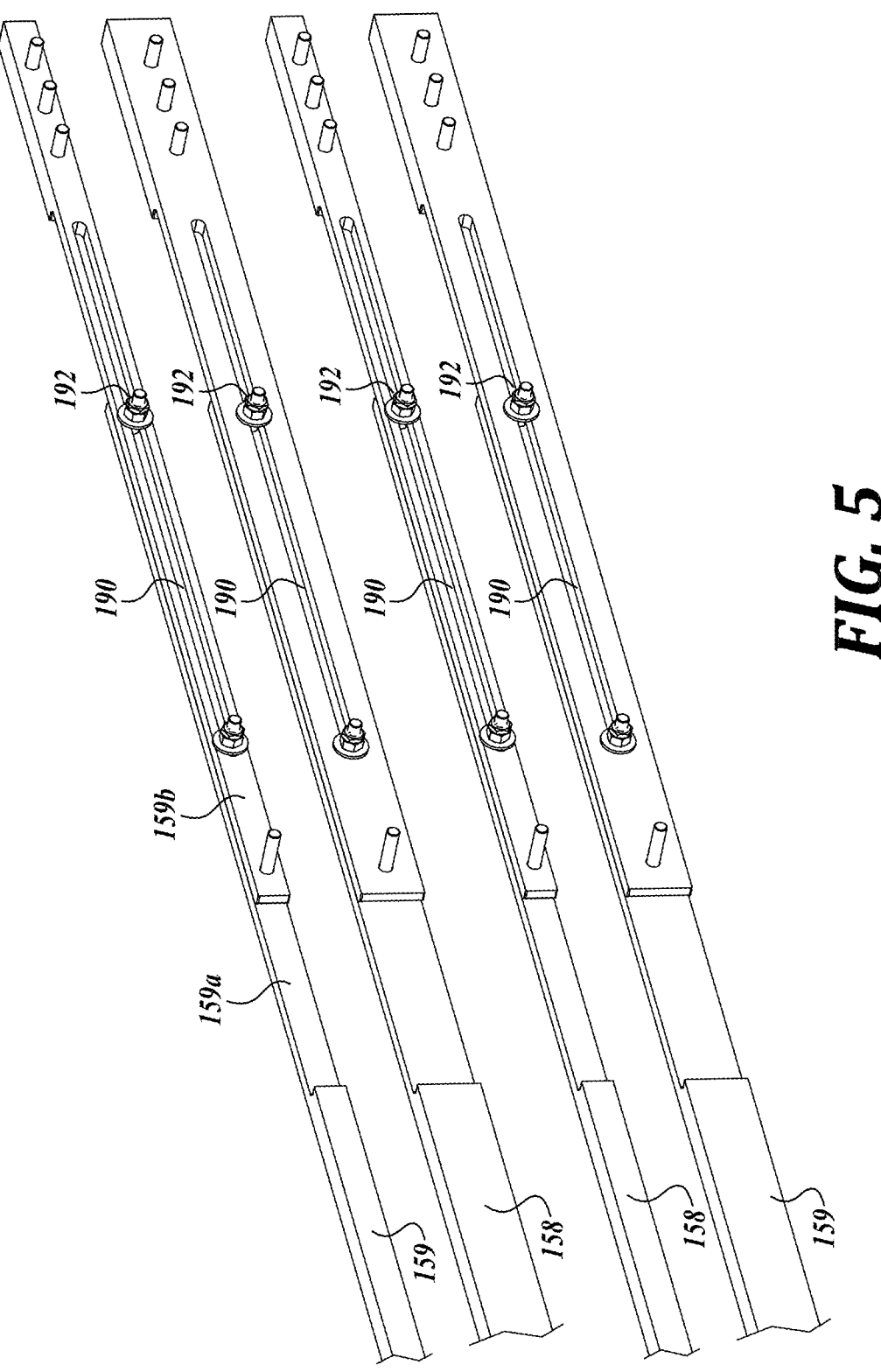
FIG. 5 is a detailed perspective view of guide rails of the laterally articulable belt conveyor system of FIG. 1.

FIG. 5 is a detailed perspective view of the guide rails 158 and 159 of the system 100. During lateral articulation of the system 100, the guide rails 158 and 159 to the outside of the curve will require a longer length than the guide rails 158 and 159 to the inside of the curve based on their spacing from the central chain 150. To accommodate the difference in lengths, the guide rails 158 and 159 can include one or more slots 190 with pins 192 configured to permit lengthening and shortening of the guide rails 158 and 159 by sliding portions with respect to each other through all the positions of articulation of the system 100. In these slotted portions of the guide rails, the rail portions overlap each other, such as shown with inner guide rail portion 159*a* and outer guide rail portion 159*b*, each of the guide rail 159. The inner and outer guide rail portions 159*a* and 159*b* slide with respect to each other to provide a continuous rolling surface for the wheels 156 during conveying. In some embodiments, the guide rails 158 and 159 can be metal or plastic, the latter of which can reduce noise, vibration, and harshness (NVH) of the system 100. The frame 104 of the system 100 (e.g., each intermediate unit 130, the ends, etc.) can be operably coupled to the guide rails 158 and 159 at positions that allow each of the guide rails 158 and 159 to bend in a relatively uniform manner, to form a gradual curve following the configuration of the system 100.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B." Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A laterally articulable belt conveyor assembly having a loading end portion and an unloading end portion, the assembly comprising:

a central chain forming a loop extending around a first roller wheel positioned at the loading end portion and a second roller wheel positioned at the unloading end portion;

a plurality of elongate slats having a central portion operably coupled to the central chain spaced apart from each of the other of the plurality of elongate slats along the central chain, each elongate slat having a first lateral end including a first rolling member and a second lateral end including a second rolling member;

a belt carried by and operably coupled to each of the plurality of elongate slats, the belt configured to carry excavated muck from the loading end portion to the unloading end portion as the central chain travels around the first and second roller wheels;

a pair of side boards extending along the central chain and spaced laterally apart above the belt, each of the side boards configured to prevent a lateral edge of the belt from buckling upward away from the plurality of elongate slats; and an upper guide rail and a lower guide rail extending at least partially from the loading end portion to the unloading end portion, the upper guide rail and the lower guide rail spaced apart to form a gap for receiving one of the first and second rolling members therebetween and directing the plurality of elongate slats along the gap, wherein the upper and lower guide rails are articulable from a straight configuration, wherein the belt travels in a straight path between the loading end portion to the unloading end portion, to a curved configuration, wherein the belt travels in a laterally curved path between the loading end portion to the unloading end portion.

2. The assembly of claim 1, wherein each of the side boards has a lip seal positioned between the respective side board and the belt, the lip seal configured to retain liquid on the belt.

3. The assembly of claim 1, wherein the upper and lower guide rails are telescoping in length such that articulation from the straight configuration to the curved configuration results in a corresponding change in length of the upper and lower guide rails.

4. The assembly of claim 1, wherein:

the upper and lower guide rails comprise first upper and lower guide rails forming a first guide rail pair;

the assembly further comprises second upper and lower guide rails forming a second guide rail pair positioned beneath the first guide rail pair;

the gap between the first guide rail pair directs the plurality of elongate slats from the loading end portion to the unloading end portion; and a gap between the second guide rail pair directs the plurality of elongate slats beneath the first guide rail pair from the unloading end portion to the loading end portion.

5. The assembly of claim 4, further comprising:

third upper and lower guide rails forming a third guide rail pair positioned laterally across the belt from the first guide rail pair; and fourth upper and lower guide rails forming a fourth guide rail pair positioned laterally across the belt from the second guide rail pair and beneath the third guide rail pair, wherein the gap between the first guide rail pair and between the second guide rail pair is configured to receive the first rolling members of the plurality of elongate slats, and wherein a gap between the third guide rail pair and between the fourth guide rail pair is configured to receive the second rolling members of the plurality of elongate slats.

6. The assembly of claim 5, further comprising an upper guide rail tie bar extending between the first guide rail pair and the third guide rail pair to maintain spacing therebetween, and a lower guide rail tie bar extending between the second guide rail pair and the fourth guide rail pair to maintain spacing therebetween.

7. The assembly of claim 5, wherein each of the first, second, third, and fourth guide rail pairs are telescoping in length such that articulation from the straight configuration to the curved configuration results in a corresponding change in length of the first, second, third, and fourth guide rail pairs.

8. The assembly of claim 1, further comprising a tensioning frame positioned at the unloading end portion, the tensioning frame movable to change the relative position of the second roller wheel with respect to the first roller wheel to adjust a tension of the central chain.

9. The assembly of claim 8, further comprising a tensioning cylinder configured to move the tensioning frame to change the relative position of the second roller wheel with respect to the first roller wheel to adjust a tension of the central chain.

10. The assembly of claim 1, wherein the first and second roller members comprise a circumferential flange extending radially outward from the first and second roller members, wherein the circumferential flange is configured to interface with the upper and lower guide rails to direct the plurality of elongate slats along the laterally curved path.

11. The assembly of claim 1, wherein the unloading end portion comprises a collector chute portion to direct the muck into a container.

12. The assembly of claim 1, wherein the loading end portion comprises a shield to direct and distribute muck on the belt during loading.

13. The assembly of claim 1, wherein the first and second roller wheels each comprise a central trough configured to receive the central chain therein, and wherein the central trough of one or both of the first and second roller wheels comprises teeth configured to interface with the central chain and prevent slipping of the central chain with respect to the first and second roller wheels.

14. The assembly of claim 13, wherein the first and second roller wheels each comprise a plurality of paddles arranged in a chevron pattern, wherein the plurality of paddles are configured to clear muck away from the belt.

15. The assembly of claim 1, wherein the belt is a flat belt.

16. The assembly of claim 1, wherein the laterally curved path has a radius from about 20 m to about 50 m.

17. The assembly of claim 1, wherein the laterally curved path has a radius from about 20 m to about 30 m.

18. The assembly of claim 1, wherein the laterally curved path has a minimum radius of about 20 m.

19. A laterally articulable belt conveyor system, comprising:
  a loading end assembly having:
    a first roller wheel;
    first upper and lower guide rails forming a first guide rail pair having a first gap therebetween; and
    second upper and lower guide rails forming a second guide rail pair having a second gap therebetween and positioned laterally across the loading end assembly from the first guide rail pair;
  an intermediate assembly articulably coupled to the loading end assembly, the intermediate assembly having:
    third upper and lower guide rails forming a third guide rail pair having a third gap therebetween; and
    fourth upper and lower guide rails forming a fourth guide rail pair having a fourth gap therebetween and positioned laterally across the intermediate assembly from the third guide rail pair;
  an unloading end assembly articulably coupled to the intermediate assembly opposite the loading end assembly, the unloading end assembly having:
    a second roller wheel;
    fifth upper and lower guide rails forming a fifth guide rail pair having a fifth gap therebetween; and
    sixth upper and lower guide rails forming a sixth guide rail pair having a sixth gap therebetween and positioned laterally across the unloading end assembly from the fifth guide rail pair;
  a central chain forming a loop extending around the first roller wheel and the second roller wheel;
  a plurality of elongate slats having a central portion operably coupled to the central chain spaced apart from each of the other of the plurality of elongate slats along the central chain, each elongate slat having a first lateral end including a first rolling member and a second lateral end including a second rolling member for directing the plurality of elongate slats along the loading end, intermediate, and unloading end assemblies; and a belt carried by and operably coupled to each of the plurality of elongate slats, the belt configured to carry excavated muck from the loading end assembly to the unloading end assembly,
  wherein the loading end, intermediate, and unloading end assemblies are articulable with respect to each other to place the system in a curved state wherein the belt travels in a laterally curved path between the first roller wheel and the second roller wheel based on the first rolling member being received within the first, third, and fifth gaps, and the second rolling member being received within the second, fourth, and sixth gaps.

20. The assembly of claim 19, further comprising:
  a first pair of side boards extending along the loading end assembly,
  a second pair of side boards extending along the intermediate assembly; and
  a third pair of side boards extending along the unloading end assembly, each pair of side boards spaced laterally apart above the belt,
  wherein each of the side boards configured to prevent a lateral edge of the belt from buckling upward away from the plurality of elongate slats.

21. The assembly of claim 20, wherein each of the side boards of each pair of side boards has a lip seal positioned between the respective side board and the belt, the lip seal configured to retain liquid on the belt.

22. The assembly of claim 19, wherein the first, second, third, fourth, fifth, and sixth guide rail pairs are telescoping in length such that articulation of the loading end, intermediate, and unloading end assemblies into the curved state results in a corresponding change in length of the first, second, third, fourth, fifth, and sixth guide rail pairs.

23. The assembly of claim 19, wherein the unloading end assembly further comprises:
  a tensioning frame; and
  a tensioning cylinder configured to move the tensioning frame to change the relative position of the second roller wheel with respect to the first roller wheel to adjust a tension of the central chain.

24. The assembly of claim 19, wherein the first and second roller members comprise a circumferential flange extending radially outward from the first and second roller members, wherein the circumferential flange is configured to interface with the guide rail pairs to direct the plurality of elongate slats along the laterally curved path.

25. The assembly of claim 19, wherein the first and second roller wheels each comprise a central trough configured to receive the central chain therein, and wherein the central trough of one or both of the first and second roller wheels comprises teeth configured to interface with the central chain and prevent slipping of the central chain with respect to the first and second roller wheels.

26. The assembly of claim 19, wherein the laterally curved path has a minimum radius of about 20 m.

27. A laterally articulable belt conveyor assembly having a loading end portion and an unloading end portion, the assembly comprising:
  a central chain forming a loop extending around a first roller wheel positioned at the loading end portion and a second roller wheel positioned at the unloading end portion;
  a plurality of elongate slats having a central portion operably coupled to the central chain spaced apart from each of the other of the plurality of elongate slats along the central chain, each elongate slat having a first lateral end including a first rolling member and a second lateral end including a second rolling member;

a belt carried by and operably coupled to each of the plurality of elongate slats, the belt configured to carry excavated muck from the loading end portion to the unloading end portion as the central chain travels around the first and second roller wheels; and an upper guide rail and a lower guide rail extending at least partially from the loading end portion to the unloading end portion, the upper guide rail and the lower guide rail spaced apart to form a gap for receiving one of the first and second rolling members therebetween and directing the plurality of elongate slats along the gap, wherein the upper and lower guide rails are articulable from a straight configuration, wherein the belt travels in a straight path between the loading end portion to the unloading end portion, to a curved configuration, wherein the belt travels in a laterally curved path between the loading end portion to the unloading end portion, and wherein the first and second roller members comprise a circumferential flange extending radially outward from the first and second roller members, wherein the circumferential flange is configured to interface with the upper and lower guide rails to direct the plurality of elongate slats along the laterally curved path.

* * * * *